United States Patent Office 3,573,069
Patented Mar. 30, 1971

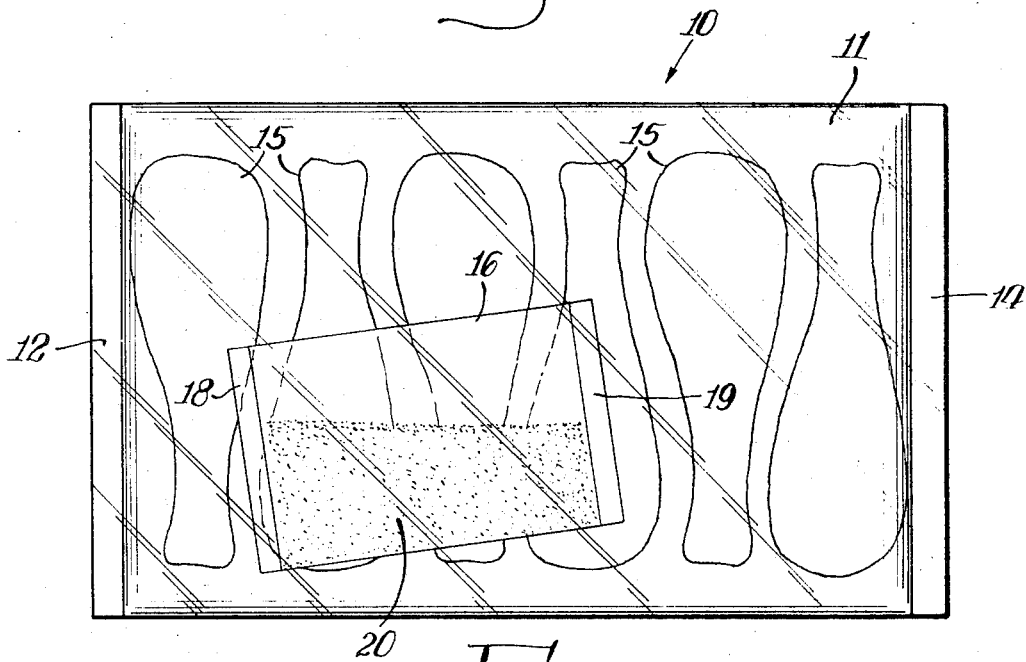
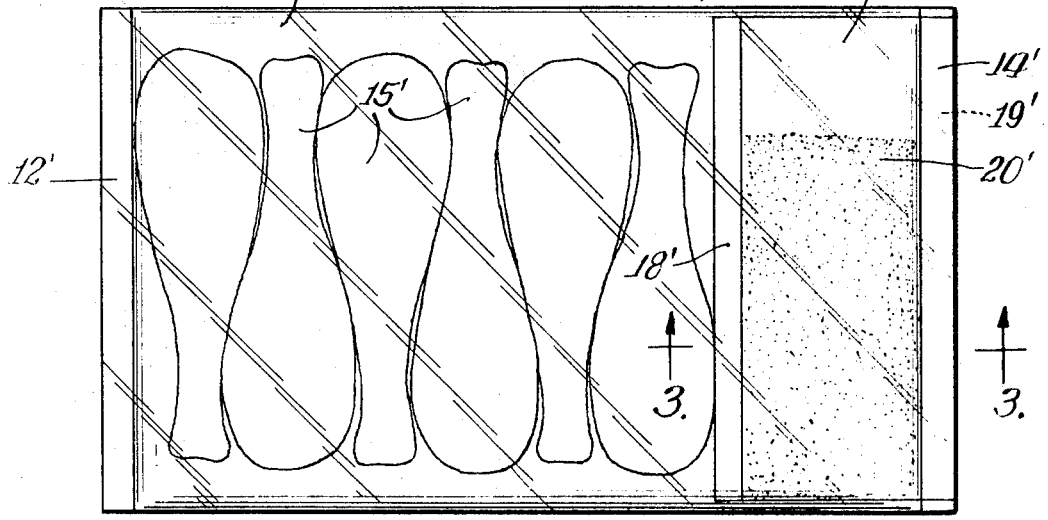
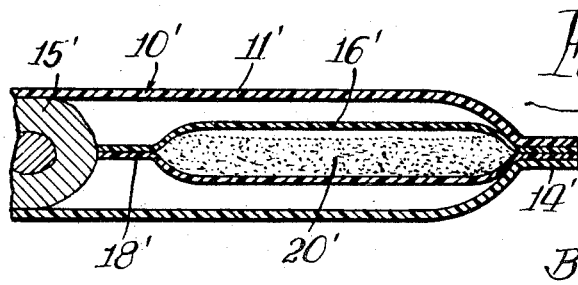

3,573,069
COMBINATION FROZEN FOOD AND BREADING COMPOSITION PACKAGE
Robert G. Keller, Waltham, and Denis Robinson, Medfield, Mass., assignors to CPC International Inc.
Filed Nov. 24, 1967, Ser. No. 685,358
Int. Cl. B65b 29/10
U.S. Cl. 99—174
13 Claims

ABSTRACT OF THE DISCLOSURE

A frozen food package comprising a pliable outer envelope, formed of a flexible film of plastic material, one or more pieces of frozen food, such as poultry, sea food, meat, and the like, disposed in the envelope, and a pouch that is also disposed in the envelope and that contains a breading composition for the food pieces. The pouch is formed to be more easily rupturable than the envelope, so that it can be burst by manipulation, to release the breading, while it is still in the envelope. The breading is then applied to the food pieces by shaking the envelope.

---

This invention relates, in general, to a novel package within a package arrangement. More particularly, the invention is directed to a sealed package for frozen food that enables the user to apply a coating of seasoned breading material to the food without removing the food or the breading mixture from the package.

It has been customary to package and to freeze uncooked pieces of fish, poultry, meat and the like. In order to use such products, the consumer must first thaw and remove the individual pieces of food from the container. Then, if they are to be breaded before cooking, the individual pieces of food are dipped in a batter and then coated with a breading composition.

Attempts have been made to provide, in frozen form, breaded and fully or substantially pre-cooked poultry or fish pieces which need only be heated by the consumer. These attempts, however, have resulted in a substantial loss in palatability in the finished product. A prime disadvantage, even with improved processes of pre-coating and pre-cooking, is that the coating of breading tends to flake, peel and become dislodged from the food pieces both when handled in a frozen state and when they are heated prior to serving, thus forming an unsightly, non-uniform product.

Pre-mixed, packaged breading compositions are well known in the art. These are usually specifically formulated for different types of foods, such as poultry, fish, or particular meats. Unfortunately, such preparations have some disadvantages. First, the consumer must make two separate purchases, i.e., the food item and the appropriate breading composition. Second, the use of such preparations involves an excessive amount of handling of the food; i.e., unpackaging, dipping, breading; and, finally, placing the food in the desired cooking utensil. Third, it is often more desirable to have breading compositions specifically seasoned for the particular food article to be breaded. For example, the seasoning of breading compositions can be specifically formulated for shrimp, flounder fillets, scallops, and the like, to produce more delicious flavors than are obtainable with a single, general purpose "sea food" breading composition.

The novel package of the present invention contains at least one piece of frozen food along with a seperate breading composition therefor. The frozen food, such as poultry, meat, vegetables, or sea food, is disposed in a tough envelope that is formed of a film of a flexible plastic material having a high bursting resistance. There is also disposed in this envelope, a pouch that contains a seasoned breading composition. The pouch is formed from a flexible film of a plastic material, to have a bursting resistance that is substantially lower than that of the outer envelope. Both the envelope and the pouch are preferably, but not necessarily, formed of transparent film.

To use this package, the consumer allows the food pieces to thaw, then ruptures the pouch that contains the breading by manipulating it while still within the envelope, thus freeing the breading composition. The envelope is then shaken, to coat the food parts completely with breading composition. The consumer finally removes the coated food pieces and places them in an appropriate utensil for cooking the breaded food piece.

In the drawing:
FIG. 1 is a plan view of a frozen food package prepared in accordance with one embodiment of the invention, with frozen chicken legs packed in an envelope along with a pouch of breading material;
FIG. 2 is a plan view of a frozen food package prepared in accordance with another embodiment of the invention, in which the pouch of breading material shares a common seam with the envelope, and thus is fixed in position, and
FIG. 3 is a fragmentary sectional view taken along line 3—3 of FIG. 2, looking in the direction of the arrows.

Referring now in detail to the drawing by numerals of reference, the numeral 10 in FIG. 1 denotes generally a frozen food package prepared in accordance with one preferred embodiment of the invention. This package is simply constructed. The outer wrap is a closed envelope 11 that is formed from a tubular sleeve of a flexible film of a clear, transparent synthetic plastic material, heat-sealed at each of its ends to form closure seams 12 and 14 respectively. The film may be made of any suitable plastic material, preferably approximately 3–4 mils thick. Six frozen chicken leg 15 are disposed within the envelopes.

A pouch 16 is also disposed within the envelope 11, along with the chicken legs. The pouch 16 is also formed from a tubular sleeve of a flexible film of a clear, transparent synthetic plastic material, heat-seated at each of its ends to form closure seams 18 and 19 respectively. The film may be made of any suitable plastic material, preferably approximately 1 to 1.5 mils thick. Seasoned breading 20 is disposed within the pouch 16.

In the package shown in FIG. 1, the pouch 16 is confined loosely in the envelope 11. It is filled and sealed, then inserted in the envelope, with the chicken legs, before the envelope is sealed.

In the modified embodiment of the invention shown in FIG. 2, the primed numerals refer to parts similarly numbered in FIG. 1. The pouch 16' in this embodiment of the invention is generally formed as was the pouch 16 in FIG. 1, but with the same width as the envelope 11'. The pouch 16' is formed at one side with a closure seal 18', and at its opposite side, has a heat-sealed seam 19' that is enclosed within, or common with, the heat sealed seam 14' of the envelope 11'. The pouch 16' is thus fixed in position within the envelope 11'.

To use a frozen food package that has been made up in accordance with the present invention, the food is permitted to thaw. The envelope is then manipulated in such a way as to cause the pouch to break and to release the breading. The package is then shaken, to cause the breading to cover the food pieces.

The envelope and pouch may be formed from any plastic film material that is suitable for food use and that is sealable. Among the preferred films are those made of polyethylene, polypropylene, ethylene-propylene copolymers, ethylene-vinyl acetate copolymers, polyvinyl chloride, polyvinylidene chloride, polyesters, polyamide, cellulosic materials or combinations of these materials, such as, for example, a lamination of polyester-polyethylene, and the like.

The inner, rupturable breading pouch and the envelope may be formed of the same film material, but this is not essential, as long as there is compatibility of the materials at all seal interfaces. The main difference in type of construction, between the two containers, is in their respective resistances to rupture or bursting. This ordinarily is most easily obtained by means of preselected differences in their respective wall strengths and burst resistances. Thus, the outer envelope preferably has a wall thickness substantially greater than that of the inner pouch, to provide greater strength and burst resistance, so that, when the user manipulates the outer envelope of the package, only the inner pouch will be ruptured. However, similar results may be obtained by forming both the envelope and the pouch from identical film, and by purposely sealing the pouch so that it has at least one seam that fails readily upon the application of pressure.

It has been found that good results are obtained when the wall thickness of the outer envelope is approximately three times that of the breading pouch. For example, when a polyethylene laminate is utilized to form both, a suitable package is obtained by having an outer envelope wall thickness of 3 to 4 mils, and an inner pouch wall thickness of 1 to 1.5 mils. However, it will be readily apparent that the 3:1 ratio is only an approximation, as the relative thicknesses of the walls will vary, depending on the type of thermoplastic material utilized for each. It will be understood, moreover, that the relative differences in strength and tear resistance between the envelope and the breading pouch may be provided by employing different sheet materials having different strengths and burst resistance values. The same relative difference in strength may also be obtained by using different structures for the outer envelope and inner pouch.

At least a part of the outer envelope should be transparent, so that the pieces of frozen food in the envelope can be seen by the consumer. The transparency of the outer envelope aids the user in locating the breading pouch when it is packed loosely in the envelope as in FIG. 1. The breading pouch may be made of an opaque thermoplastic film material although it, too, may be transparent.

The breading pouch should be filled and sealed in such a way that some gas, usually air, is trapped within the pouch. This trapped gas facilitates bursting of the pouch by the development of sufficient pressure to cause bursting, when the pouch is squeezed. It has been found that ordinarily the pouch ruptures with better results when it bursts along a sealed edge than when it bursts along a fold line or elsewhere. For this reason, it is preferred to use a pouch construction such as shown in FIGS. 1 and 2, although other constructions are available.

The envelope ordinarily should contain as little trapped gas or air as is feasible to insure immobilization of the pieces of frozen food, to limit damage to the envelope in shipping. However, the package nevertheless should contain a sufficient volume of trapped gas so that, after the pouch is broken, the breading can circulate freely within the envelope when the envelope is shaken.

The food pieces are ordinarily frozen before they are packed in the envelope. Freezing temperatures of about —40° F. are commonly used, with subsequent storage at a temperature in the range from about —10° F. to about 0° F. The frozen food pieces ordinarily need not be exposed to ambient temperatures, during packing, for a sufficiently long time to cause thawing.

While only a single type of fabrication for the envelope and pouch has been described, other types of fabrication are known and may be used. For example, instead of using extruded tubing as has been described, a "pillow" construction can be used, with one marginal edge of a folded-over sheet of film applied to and sealed to the back, and with two end seals to effect closure. For another example, the breading pouch and envelope could be fabricated simultaneously from two or three webs, and subsequently slit for filling the breading and chicken. The breading and chicken may be passed into their respective containers from the same end of the package, or from opposite ends, depending on the configuration of the equipment being used.

Although the present invention is particularly useful in the packaging of frozen poultry products, it is to be understood that it is not limited thereto, but is applicable to food products of all kinds which may be breaded. Illustrative examples of such types of foods are: poultry, such as chicken, turkey, duck and the like; sea foods, such as scallops, shrimp and the many kinds of fish fillets; meats, such as beef steaks and pork chops; certain vegetables such as eggplant slices or onion rings; and other like products.

The seasoned breading compositions packaged with the frozen food parts may be any of the usual preparations used for such purposes. A basic breading formulation, which may be composed of such materials as bread crumbs, wheat flour, corn flour, cornmeal, cracker crumbs, or mixtures thereof, is preferred. In addition, the breading mixture may contain milk solids, seasonings such as salt, paper, herbs, and spices, and flavoring and coloring agents. The seasoned breading composition may be prepared for the particular kind of frozen food with which it is packed.

The combination food and breading package of the present invention has many advantages. First, the breading operation is accomplished just before the food is cooked, thus eliminating the chipping and peeling of the breading that often occurs in pre-breaded food products. Second, the food product may be quick-frozen immediately after the animal or fowl is slaughtered, or after the sea food is taken from the water, thus retaining the natural juices which might otherwise be lost in pre-cooking or other pre-breading operations. When the frozen food is thawed, these juices are released and form the liquid needed to moisten the breading composition sufficiently for adherence to the food pieces, thus eliminating the dipping step in the usual breading method. Third, the combination frozen food and breading composition of the present invention is highly convenient for the consumer in that only one purchase is necessary and the amount of the proper breading composition is sufficient for the amount of food present without undue waste. Most importantly, the user need handle the breaded food pieces only briefly, to transfer them to the appropriate cooking utensil. Finally, the combination package of the present invention allows each of a variety of meats, poultry, sea foods, and the like to be packaged with seasoning composition specifically formulated to complement the particular variety of food.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the esesntial features hereinbefore set forth, and as fall within the scope of the invention and the limits of the appended claims.

We claim:
1. A package for frozen food comprising:
   a closed envelope that is formed of a flexible film of synthetic plastic material;
   a plurality of pieces of frozen food disposed within the envelope, said food being selected from the group consisting of meat, seafood, and fowl;
   a pouch, that is also formed of a flexible film of synthetic plastic material, disposed within said envelope along with the pieces of frozen food; and
   a breading material disposed within said pouch for coating the food pieces upon release from the pouch;

said pouch being formed to be more easily rupturable than said envelope.

2. A package in accordance with claim 1 wherein the flexible film from which the pouch is formed is of thinner gauge than the flexible film from which the envelope is made, to permit rupture of the pouch by manipulation applied while the pouch is within the envelope.

3. A package in accordance with claim 2 wherein said food pieces and said pouch are both loosely disposed within the envelope.

4. A package in accordance with claim 2 wherein the envelope and the pouch are heat-sealed together along at least one common seam, so that the pouch is retained in a fixed position within the envelope.

5. A package comprising:
  a sealed outer container of flexible thermoplastic resinous sheet material, at least a portion of said sealed outer container being transparent;
  a frozen food product disposed within said sealed outer container, said frozen food product being adapted to be encased in a coating of a breading mixture prior to use;
  a sealed, rupturable inner container of a flexible thermoplastic resinous sheet material disposed within said sealed outer container; and
  a seasoned, particulate breading composition disposed within said sealed rupturable inner container, said inner container being more easily ruptured than said sealed outer container, to permit the rupture of said sealed, inner container upon the application of pressure to said sealed outer container, while said outer container remains sealed and intact.

6. The package of claim 5 wherein said frozen food product is a member selected from the group consisting of poultry, meat, sea food and vegetables.

7. The package of claim 5 wherein said flexible thermoplastic resinous material of said sealed outer container is of the same chemical composition as said flexible thermoplastic resinous material of said sealed inner container.

8. The package of claim 7 wherein said flexible thermoplastic resinous materials of said sealed outer and inner containers are polyethylene.

9. The package of claim 5 wherein said flexible thermoplastic resinous material of said sealed outer container is of a different chemical composition than that of said flexible thermoplastic resinous material of said sealed inner container.

10. The package of claim 5 wherein the flexible thermoplastic resinous sheet material of said sealed outer container is substantially thicker than the flexible thermoplastic resinous sheet material of said sealed inner container.

11. The package of claim 5 wherein said sealed inner container is loosely disposed within said sealed outer container.

12. The package of claim 5 wherein said sealed inner container is affixed to the flexible thermoplastic resinous sheet material of said sealed outer container.

13. The package of claim 5 wherein said sealed inner container is composed of a flexible thermoplastic resinous sheet material that is weaker than the flexible thermoplastic resinous sheet material of said sealed outer container, whereby said sealed inner container can be ruptured while said sealed outer container remains sealed and intact.

References Cited

UNITED STATES PATENTS

| | | | |
|---|---|---|---|
| 1,332,985 | 3/1920 | Jarrett | 99—171X |
| 1,983,685 | 12/1934 | Townsley | 99—171X |
| 2,469,204 | 5/1949 | Peters | 99—171X |
| 2,824,010 | 2/1958 | Pedersen | 99—171X |
| 2,899,318 | 8/1959 | Long | 99—174X |
| 2,907,173 | 10/1959 | Robbins | 99—171X |
| 2,918,378 | 12/1959 | Joiner | 99—192X |
| 3,012,894 | 12/1961 | Nagel | 99—192 |
| 3,293,048 | 12/1966 | Kitterman | 99—171X |

OTHER REFERENCES

Quick Frozen Foods, December 1954, 74.

FRANK W. LUTTER, Primary Examiner

R. HALPER, Assistant Examiner

U.S. Cl. X.R.

99—194; 206—46